(12) United States Patent
Austad et al.

(10) Patent No.: US 12,189,939 B2
(45) Date of Patent: Jan. 7, 2025

(54) GESTURE DETECTION SYSTEM

(71) Applicant: TK&H Holding AS, Tjøme (NO)

(72) Inventors: Tom Austad, Tjøme (NO); Hans Zwart, Apeldoorn (NL)

(73) Assignee: TK&H HOLDING AS, Tjome (NO)

( * ) Notice: Subject to any disclaimer, the term of this patent is extended or adjusted under 35 U.S.C. 154(b) by 0 days.

(21) Appl. No.: 17/798,787

(22) PCT Filed: Feb. 16, 2021

(86) PCT No.: PCT/EP2021/053735
§ 371 (c)(1),
(2) Date: Aug. 10, 2022

(87) PCT Pub. No.: WO2021/165242
PCT Pub. Date: Aug. 26, 2021

(65) Prior Publication Data
US 2023/0098116 A1    Mar. 30, 2023

(30) Foreign Application Priority Data

Feb. 17, 2020  (NO) .................................... 20200205
Aug. 18, 2020  (NO) .................................... 20200912

(51) Int. Cl.
*G06F 3/0488*    (2022.01)
*G02B 27/01*    (2006.01)
(Continued)

(52) U.S. Cl.
CPC ....... *G06F 3/0488* (2013.01); *G02B 27/0176* (2013.01); *G06F 3/044* (2013.01);
(Continued)

(58) Field of Classification Search
CPC ... G02B 27/0176; G06F 3/044; G06F 3/0482; G06F 3/04847; G06F 3/0488; G06F 3/16
See application file for complete search history.

(56) References Cited

U.S. PATENT DOCUMENTS 6,690,807 B1   2/2004  Meyer
8,177,361 B2   5/2012  Sessner
(Continued)

FOREIGN PATENT DOCUMENTS

CA         2559844     10/2005
CN       107402677    11/2017
(Continued)

OTHER PUBLICATIONS

Kickstarter brochure, "The Worlds Smallest Wireless Earbuds", https://www.kickstarter.com/projects/earin/earin-the-worlds-smallest-wireless-earbuds#:~: text=Earin%20is%20the%20smallest,%20wireless,delivering%20high%20quality%20audio%20sound.
(Continued)

*Primary Examiner* — Seth A Silverman
(74) *Attorney, Agent, or Firm* — Wissing Miller LLP

(57) ABSTRACT

The present invention discloses a gesture detection system comprising a linear capacitive slider sensor configured to sense when a finger is close to the sensor surface, or is touching or is lifted or moved away from the sensor surface, and a direction of movements of the finger across the sensor surface, and when the finger is lifted away from the sensor surface, a combination of finger movements across the sensing surface is interpreted as a detectable gesture by the gesture detection system.

15 Claims, 8 Drawing Sheets

Figure 1:
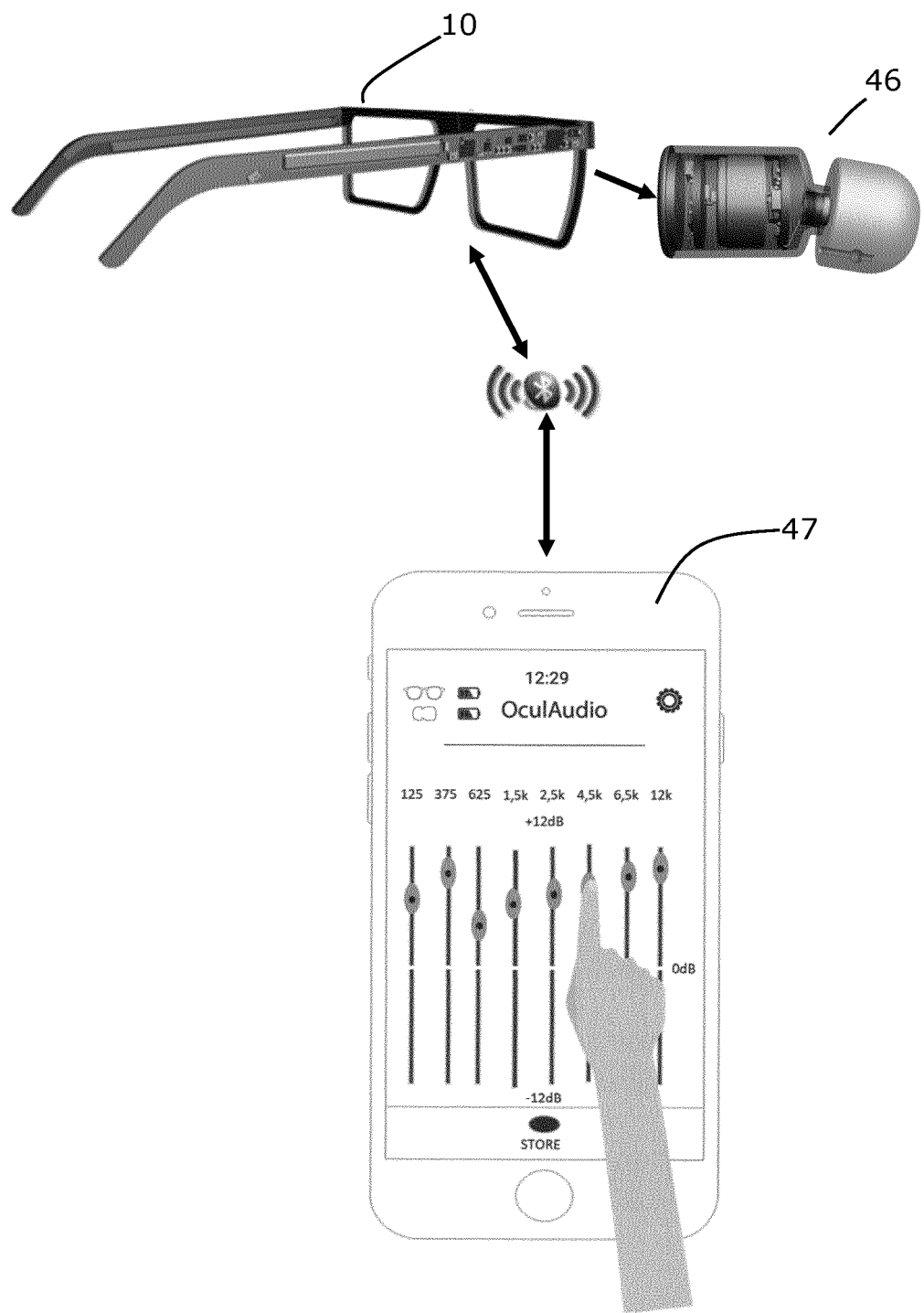

(51) Int. Cl.
    *G06F 3/044*     (2006.01)
    *G06F 3/0482*     (2013.01)
    *G06F 3/04847*     (2022.01)
    *G06F 3/16*     (2006.01)

(52) U.S. Cl.
    CPC ........ *G06F 3/0482* (2013.01); *G06F 3/04847* (2013.01); *G06F 3/16* (2013.01); *G02B 2027/0178* (2013.01)

(56) References Cited

U.S. PATENT DOCUMENTS

| | | | |
|---|---|---|---|
| 8,854,452 | B1 | 10/2014 | Raffle |
| 9,104,242 | B2 | 8/2015 | Xiong |
| 10,347,246 | B2 | 7/2019 | Lee |
| 2010/0231546 | A1 | 9/2010 | Digon |
| 2013/0141375 | A1* | 6/2013 | Ludwig .................. G06F 3/017 345/173 |
| 2013/0263251 | A1* | 10/2013 | Fleizach ................ G06F 21/36 726/19 |
| 2013/0278631 | A1 | 10/2013 | Border |
| 2014/0118281 | A1* | 5/2014 | Baker ................ G06F 3/04883 345/173 |
| 2014/0181750 | A1 | 6/2014 | Fujiwara |
| 2014/0266988 | A1* | 9/2014 | Fisher ................ G06F 3/04886 345/8 |
| 2015/0088500 | A1 | 3/2015 | Conliffe |
| 2015/0169120 | A1* | 6/2015 | Sanchez ............... G02B 27/017 345/173 |
| 2016/0277850 | A1 | 9/2016 | Li |
| 2016/0342220 | A1* | 11/2016 | Kim ........................ G06F 3/005 |
| 2016/0364025 | A1 | 12/2016 | Bernstein |
| 2017/0255327 | A1 | 9/2017 | Simmons |
| 2018/0120949 | A1* | 5/2018 | Lai .................... H04N 21/4223 |
| 2019/0138199 | A1* | 5/2019 | Pagliaccio ............ G06F 3/0482 |
| 2019/0174237 | A1 | 6/2019 | Lunner |
| 2019/0391391 | A1 | 12/2019 | Pazmino |
| 2020/0012110 | A1 | 1/2020 | Blum |
| 2020/0019367 | A1 | 1/2020 | Sun |

FOREIGN PATENT DOCUMENTS

| | | |
|---|---|---|
| EP | 2214087 | 1/2009 |
| EP | 3267697 | 4/2017 |
| EP | 3496417 | 12/2019 |
| JP | 6514599 | 5/2019 |
| KR | 20130038785 | 4/2013 |
| WO | 2004028203 | 4/2004 |
| WO | 20160131064 | 8/2016 |
| WO | 2016148875 | 9/2016 |

OTHER PUBLICATIONS

Office Action mailed in Priority Norwegian Application 20200912 on Jul. 29, 2021 (5 pages).
Search Report mailed in Priority Norwegian Application 20200912 on Jul. 29, 2021 (2 pages).
Office Action mailed in Priority Norwegian Application 20200205 on Jun. 5, 2020 (6 pages).
PCT Search Report and Written Opinion mailed in corresponding PCT/EP2021/053735 on Jun. 18, 2021 (15 pages).
Search Report mailed in Priority Norwegian Application 20200205 on Jun. 5, 2020 (2 pages).
TDK, Product Sheet for ICS-41351 (https://invensense.tdk.com/products/digital/ics-41351/), May 20, 2020 (23 pgs).
Analog Devices, Product Sheet for ADAU1787 (https://www.analog.com/en/products/adau1787.html#product-overview), 2019-2020 (280 pgs).
Fujitsu, White Paper for Capacitive Touch Sensors (https://www.fujitsu.com/downloads/MICRO/fme/articles/fujitsu-whitepaper-capacitive-touch-sensors.pdf), Jan. 12, 2010 (12 pgs).
PCT International Preliminary Report on Patentability mailed in corresponding PCT/EP2021/053735 on Aug. 23, 2022 (8 pgs).

* cited by examiner

GESTURE DETECTION SYSTEM

CROSS-REFERENCE TO RELATED APPLICATIONS

This application is a 371 of PCT/EP2021/053735 filed on Feb. 16, 2021, published on Aug. 26, 2021 under publication number WO 2021/165242, which claims priority benefits from Norwegian patent application No. 20200205 filed Feb. 17, 2020 and Norwegian patent application No. 20200912 filed Aug. 18, 2020, the disclosure of each is incorporated herein in their entirety by reference.

TECHNICAL FIELD

The present invention is related to a gesture detection system comprising at least a sensing surface capable of sensing a direction of movement of a finger moving across the sensing surface.

BACKGROUND

The gesture detection system according to the present invention is a general-purpose system. The association between respective gestures and a specific command or an activation of a certain function etc. is dependent on the functionality of the system the gesture detection system is connected to.

The present description of the gesture detection system refers to an eyeglass frame of a hearing aid system, wherein the eyeglass frame comprises embedded microphones and a System On a Chip (SOC) computer system controlling a Digital Signal Processor (DSP) etc. The reference to an eyeglass frame system of a hearing aid system is just an example of a complex system the gesture detection system of the present invention beneficially can be connected to.

The example of an eyeglass frame of a hearing aid system may be used by people having partial hearing loss, but not necessarily having additional problems with their visual vision. In such cases the eyeglass frame is just a support structure that can simplify for example beamforming of microphones embedded in the eyeglass frame. Insertable earbuds in human ears can be in wireless communication with the eyeglass frame system. The beam forming may for example be configured to respond to specific gestures detected by a connected gesture detection system of the present invention.

If a person has additional problems with their visual vision the eyeglass frame can support adapted eyeglasses mitigating reading problems etc. In addition, the eyeglass frame may comprise an embedded video camera configurable to detect different objects like waste bins etc. and the system may provide an audible message to the wearer of the eyeglass frame as a wirelessly transmitted voice messages to the earbuds insertable into the respective ears of the wearer of the eyeglass frame.

Modern computer systems are powerful machines that can be configured with a variety of advanced software applications helping humans with different tasks. Man-machine communication has evolved in most cases to be relying for example on touch sensitive surfaces and/or mouse devices interacting with graphical objects on a display as known in prior art.

The use of touch sensitive surfaces as input devices for computers and other electronic computing devices has increased significantly in recent years. Most commonly is to add a touch sensitive surface to a display surface. In this manner, a combination of displayed symbols and touching can be achieved for example. Exemplary touch-sensitive surfaces include touch pads and touch screen displays on computers and smart phones etc. Such surfaces are widely used to review and edit electronic documents by manipulating a cursor within the electronic document presented on a display, and to select between different implemented functions (application specific programs etc.). An example is disclosed in WO 2016/148875 A2.

Another alternative area of interest in prior art is machine vision-based human-machine interaction. For example, U.S. Pat. No. 9,104,242 B2 disclose a palm gesture recognition method comprising a step of obtaining plural images during an ordered time stamped sequence of video frames, a step of acquiring plural palm shaped images from the plural images, a step of extracting plural features describing an open or closed palm gesture from each of the plural palm shaped images, a step of calculating a maximum feature difference vector formed by a maximum difference of each of the plural features, and a step of determining, on the basis of the maximum feature difference vector, that the open or closed palm gesture can be detected.

Another alternative area of interest in prior art is voice recognition used in man-machine interactions. For example, U.S. Ser. No. 10/347,246 B2 discloses a method and an apparatus for executing a user requested action using voice recognition. The method includes displaying a user function execution screen, confirming a function to be executed according to voice input, displaying a voice command corresponding to the confirmed function on the user function execution screen, recognizing a voice input by a user, while a voice recognition execution request is continuously received, and executing the function associated with the input voice command, when the recognized voice input is at least one of the displayed voice commands.

JP 6514599 B2 discloses an eyeglass frame supporting directional microphones located on the front side of the eyeglass frame. Omni-directional microphones are provided on the respective left and right eyeglass arms. Loudspeakers are also provided on the respective left and right eyeglass arms. A touch sensitive sensor on the left eyeglass arm is configured to control activation of the directional microphones by touching the sensor and an audio signal is transmitted to the loudspeakers.

Any man-machine communication system should provide a bi-directional communication channel. The system or machine should be able to convey messages to the operator using the man-machine communication system either as instructions or as information, for example.

An example of providing graphical information to a person wearing an eyeglass frame is illustrated in for example U.S. Pat. No. 8,177,361B2 which disclose a spectacle lens having a first and a second surface, wherein at least the first surface of the spectacle lens has a major portion zone and at least one prism zone. The major portion zone of the first surface, together with the opposing second surface of the spectacle lens, forms a major portion of the spectacle lens, which is designed for vision in at least a predetermined distance. The prism zone of the first surface, together with the opposing second surface of the spectacle lens, forms a prism portion, which is designed and arranged such that an optical image of a display is formed at a predetermined virtual distance in front of the eyes of the spectacle wearer.

These examples of man-machine interaction systems have some apparent shortcomings with respect to for example an eyeglass frame of a hearing aid system, which may also be used by persons with reduced eyesight. For example, adding obstacles in the form of a graphical display in the field of view of an eye of a person having reduced eyesight is probably not a good idea. Even if a person has adapted eyeglasses mitigating to some extent loss of eyesight, the eyeglasses can for example be adapted to driving a car or is adapted to reading. The same may also be the case with optical three-dimensional gesture detection. A person with reduced eyesight needs to learn for example a certain movement or rotation of a hand, which may be difficult to see and if the movement is learned the person need to see that the correct movement(s) representing a specific gesture is made if the gesture detection system fails to recognize the gesture. Further, using optical detection of hand movements is not a discreet operation which may stop a person with for example a partial hearing loss to use the hearing aid system in an optimal manner in public areas. For example, some gestures are certainly not possible to implement like a finger up in the air.

A further general problem with gesture detection systems is the number of different gestures that may be differentiated and associated with different commands or actions in the connected machine or computer system.

It is therefore a need of an improved gesture detection system.

OBJECT OF THE INVENTION

In particular, it may be seen as an object of the present invention to provide a gesture detection system comprising at least a linear capacitive slider sensor providing detection of a movement of a finger moving across the sensor surface.

It is a further object of the present invention to provide an alternative to the prior art.

SUMMARY

Thus, the above-described object and several other objects are intended to be obtained in a first aspect of the invention by providing a gesture detection system comprising at least one linear capacitive slider sensor, wherein a sensor surface of the at least one linear capacitive slider sensor is integrable on an outer surface of a computer-controlled device, wherein the capacitive slider sensor is configured to detect movements of a finger moving along a longitudinal direction on the sensor surface from a first end of the sensor surface to a second end located opposite the first end,
  wherein the gesture detection system is configured to interpret different detected finger movement patterns across the sensor surface as different gestures,
  wherein the interpretation of a respective one of respective finger movement combinations is performed when the linear capacitive slider sensor detects that a finger is lifted at the first end or the second end of the sensor surface after at least one finger movement has been detected across the sensor surface in any direction between the first edge and the second edge.

FIGURES

The gesture detection system according to the present invention will now be described in more detail with reference to the accompanying figures. The figures illustrate examples of embodiments of the present invention and is not to be construed as being limiting to other possible embodiments falling within the scope of the attached claim set.

Further, respective examples of embodiments may each be combined with any of the other examples of embodiment.

Figure 2:
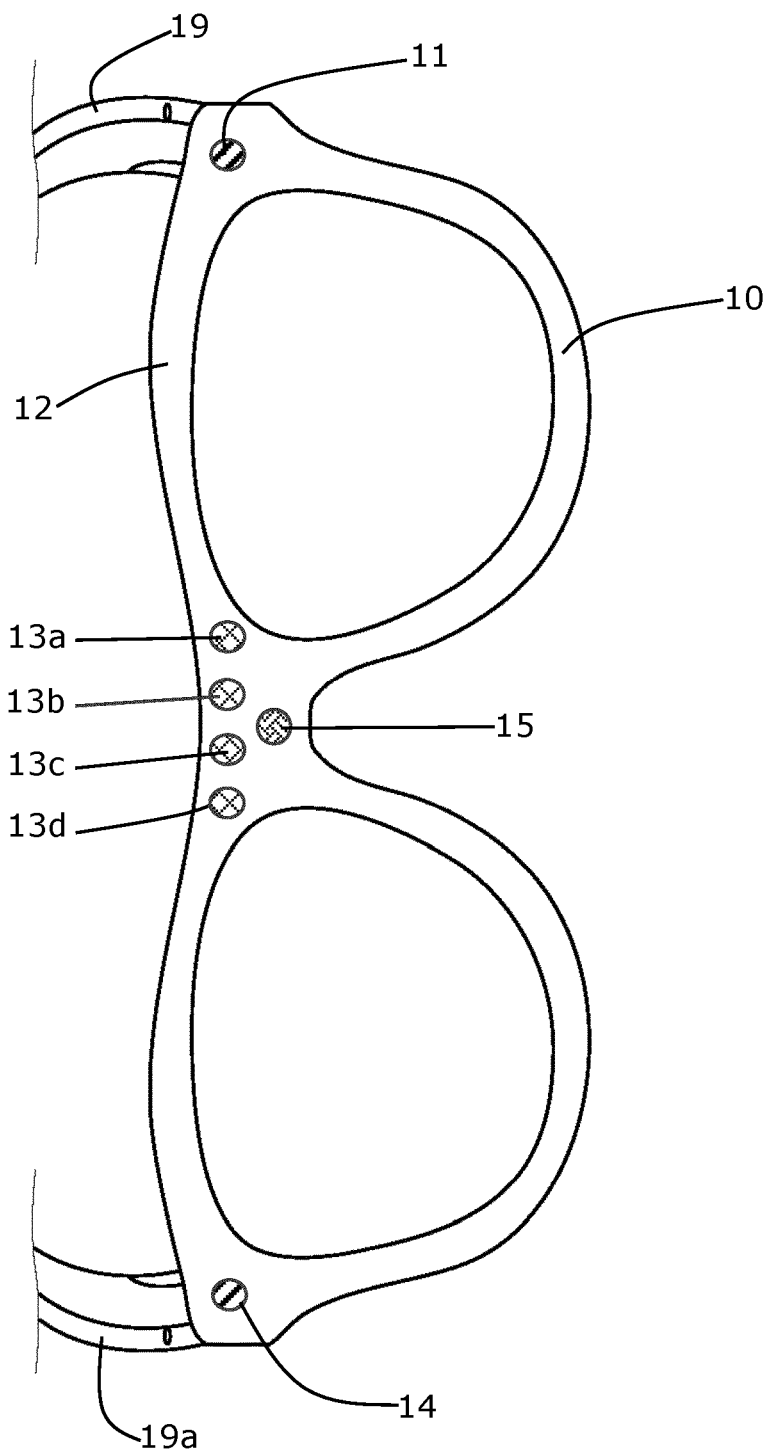
Figure 3:
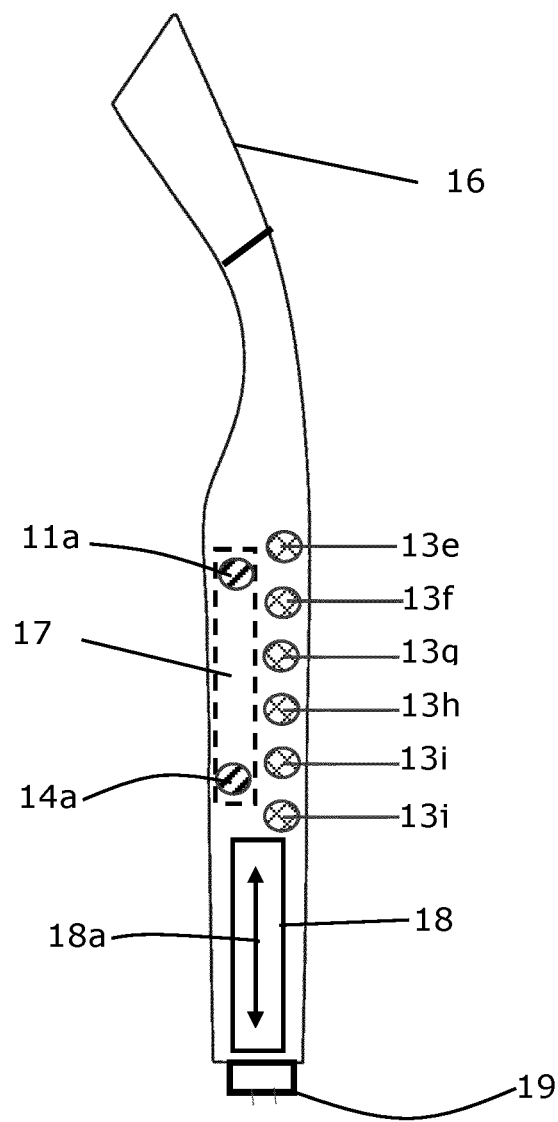
Figure 4:
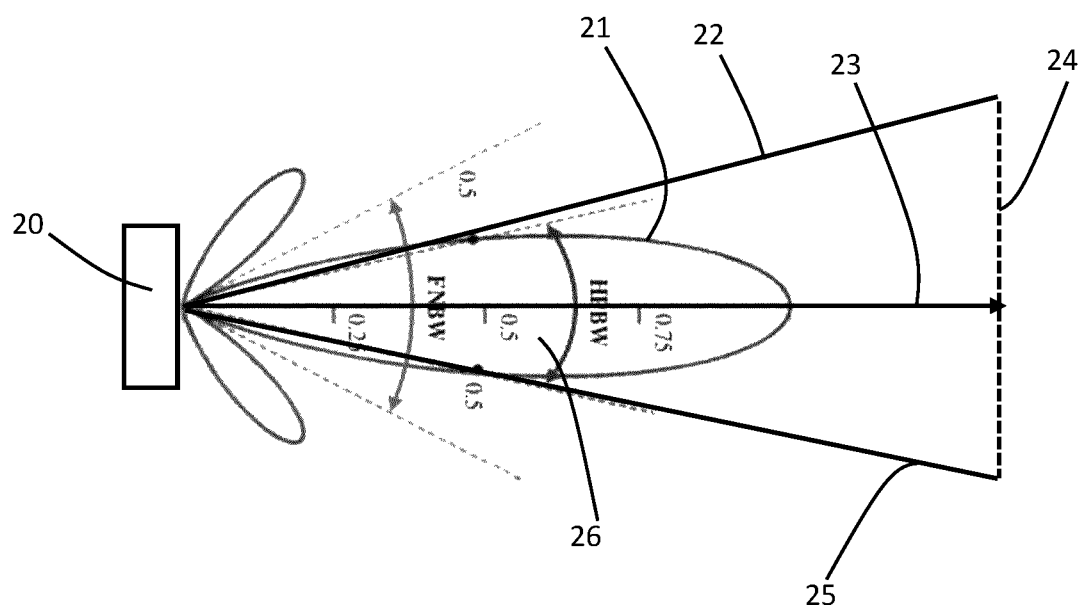
Figure 5:
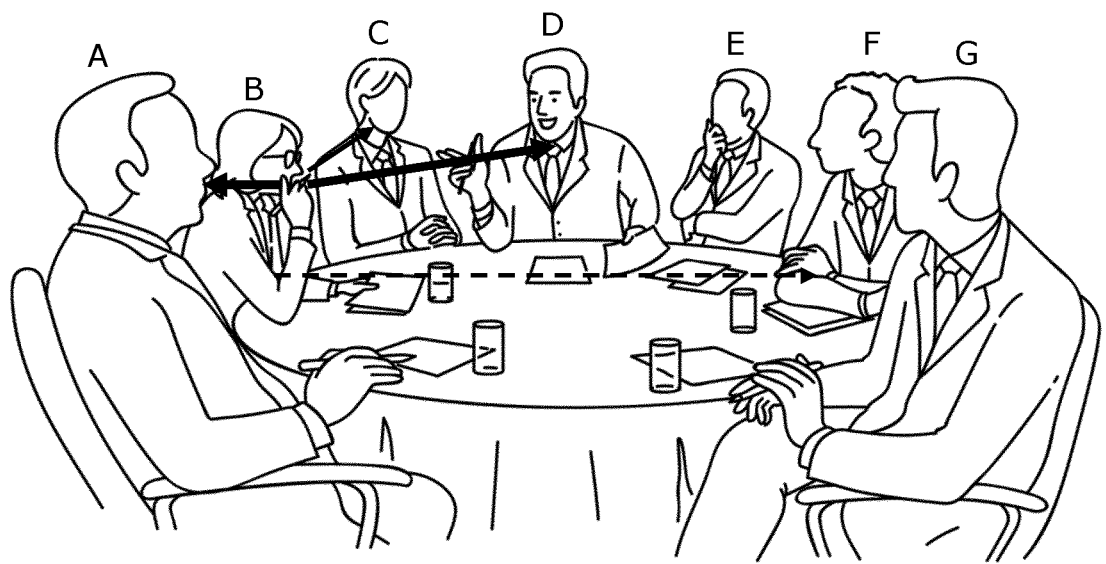
Figure 6:
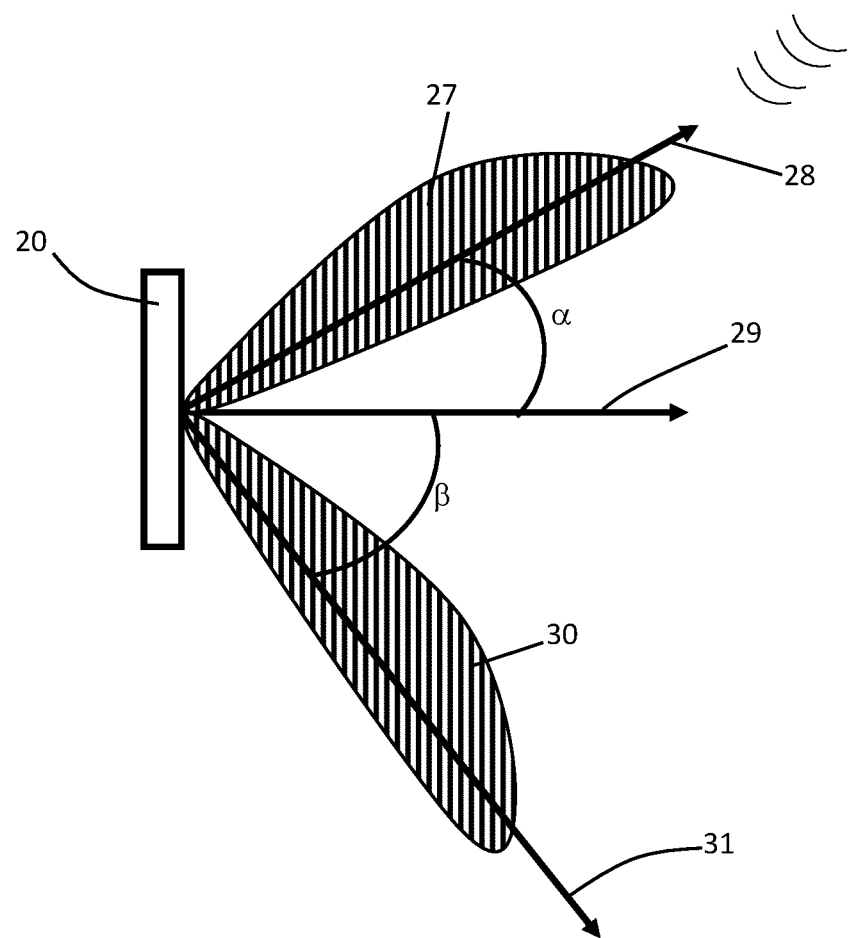
Figure 7A:
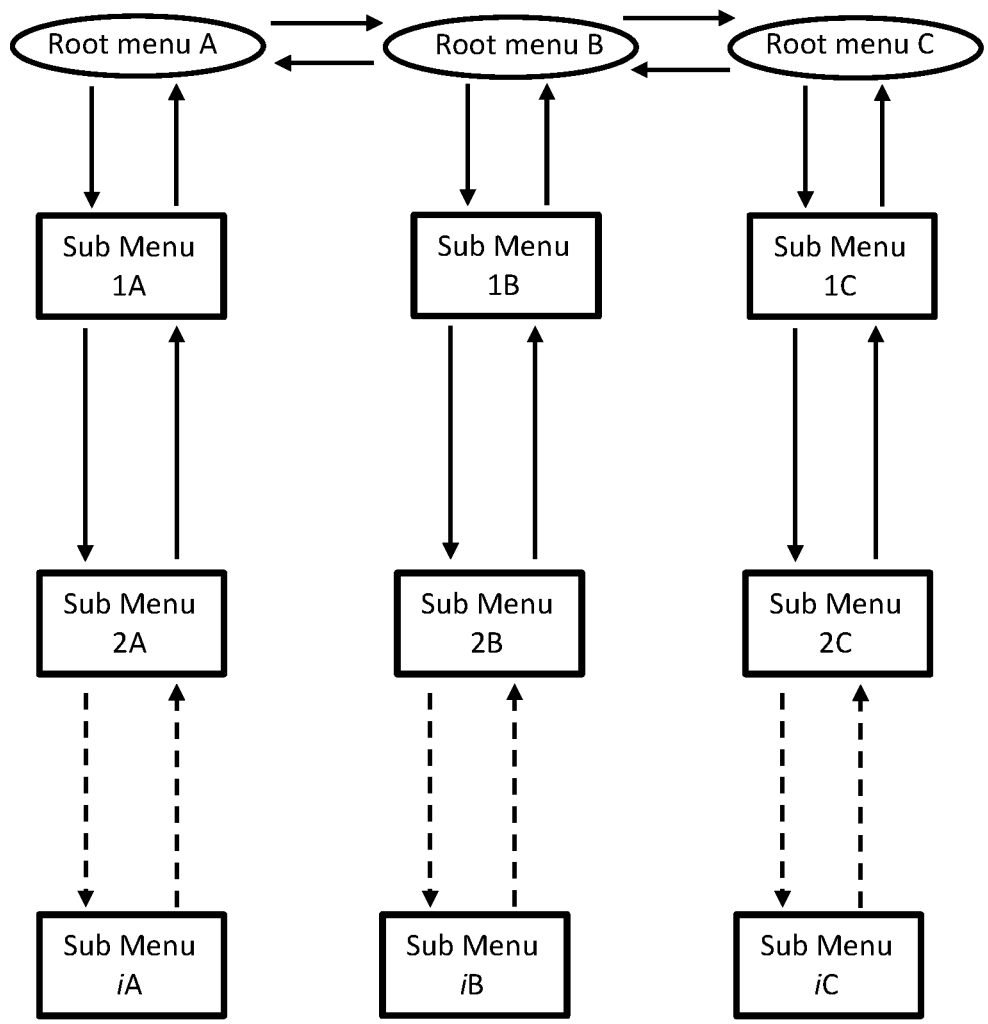
Figure 7B:
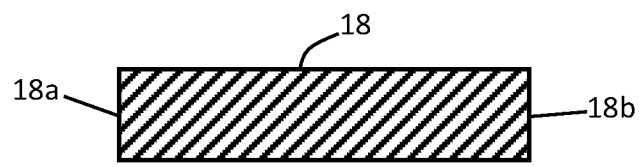
Figure 8:
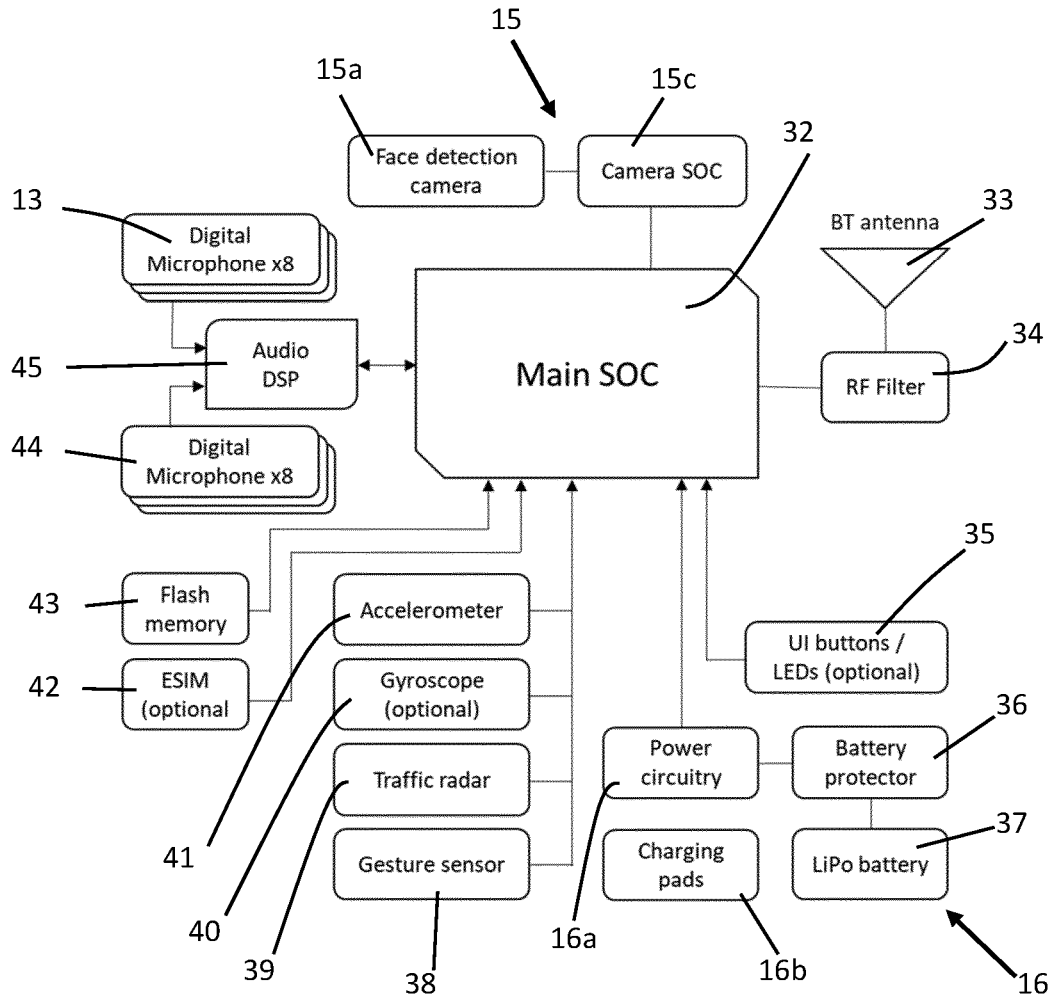

FIG. 1 illustrates an example of hearing system.
FIG. 2 illustrates a front view of the example illustrated in FIG. 1.
FIG. 3 illustrates further details of the example illustrated in FIG. 2.
FIG. 4 illustrates an example of microphone beamforming.
FIG. 5 illustrates another example of beamforming.
FIG. 6 illustrates another example of beamforming.
FIG. 7a illustrates an example of embodiment of the present invention.
FIG. 7b illustrates an example of an embodiment of the present invention.
FIG. 8 illustrates an example of a hardware configuration the present invention can be part of.

DETAILED DESCRIPTION

Although the present invention has been described in connection with the specified embodiments, it should not be construed as being in any way limited to the present examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference sign in the claims with respect to elements indicated in the figures shall also not be construed as limiting to the scope of the invention. Furthermore, individual features mentioned in different claims, may possibly be advantageously combined, and the mentioning of these features in different claims do not exclude that a combination of features is not possible and advantageous.

The present invention is directed towards a general-purpose gesture detection system that can be connected to many types of systems. In the following description below, a hearing aid system comprising an eyeglass frame is used just as an example of a complex system the gesture detection system of the present invention beneficially can be connected to.

An aspect of the present invention is to provide a gesture detection system that do not need visual interaction from a user of the system. With reference to the eyeglass frame above, this aspect makes it possible to integrate a sensor surface in an eyeglass arm of an eyeglass frame a user can activate by touching a sensor surface with his finger.

Modern integrated circuit technology provides increased complexity and functionality on small sized wafers of respective circuits, which enables integration of sensors and an embedded computer system comprising at least one SOC (System On a Chip) and at least one DSP (Digital Signal Processor) in for example an eyeglass frame of a hearing aid system. Many SOC systems is supported by the LINUX operating system and LINUX device drivers supporting different types of sensors and DSP circuits is available as well.

An exemplary purpose of such a gesture detection system is to control and/or modifying functionality of application programs running in the eyeglass frame system, or more generally in a computer-controlled device. For example, beamforming can be done in an embedded DSP under control of a program running in an embedded SOC system and can be configured to be in a direction the front of the eyeglass frame is pointing, i.e., which corresponds to an eyesight direction, or other directions as defined for example by gesture detection of specific commands etc. Specific gesture inputs can be used to alter for example the direction of a beam forming lobe relative to an eyesight direction, or for example, a width of a beamforming lobe may be adjusted to be broader or smaller etc.

Other types of sensors, for example a gyroscopic sensor, a distance measurement sensor etc., may be embedded into the eyeglass frame and such sensor outputs may be part of a decision loop the SOC system may be configured to make whenever a microphone beamforming should be made, for example. Gesture control input may alter for example the decision loop and/or how respective sensors are functioning. For example, setting a compass direction of an embedded gyroscopic sensor to zero degrees can be made as a relative position being the direction the eyeglass front of the eyeglass frame is pointing towards when a specific gesture input is made by a wearer of the eyeglass frame.

If a person with partial hearing loss has additional eyesight problems, the eyeglass frame may comprise an embedded video camera, which can be configured to enhance visual perception for a wearer of the eyeglass frame. The embedded video system can be configured to detect contours of common objects like a dust bin in a street, an approaching car, a bird singing etc. and the SOC system may be configured to convey audible voice messages indicating respective objects to the wearer of the eyeglass frame via insertable earbuds in the ear canals of the wearer of the eyeglass frame. This possibility of recognizing different objects may also be utilized in some beamforming scenarios, for example identifying a bird from the bird song and the direction to the bird. A gesture control input may be used for example providing a beamforming in the direction of the bird away from the eyesight direction, or providing a zooming out or in of the field of view of the video camera etc.

However, beamforming is also dependent on the type of hearing scenario a person with partial hearing loss is part of. For example, a conversation can for example be between the person with partial hearing loss and one other person, which may require a narrow beam lobe.

Another type of hearing scenario may be when a person with partial hearing loss is participating in a conference with for example several other persons, which may require a wider beam lobe.

Therefore, more than one spatial beamforming lobe may be necessary, which may be activated by gesture input from the wearer of the eyeglass frame. Further, the eyeglass frame system may be configured with different beam forming lobes reflecting certain needs of different scenarios as exemplified above. Via gesture input detection it is possible to change or select a specific scenario providing specific microphone beam forming lobes.

Another scenario can be when sitting on a train talking to someone sitting in front of you. A beamforming according to the present invention can be accurate thereby enabling good audible contact with a person in front of you. Such a sharp beamforming has also a downside. If you need to bend down, for example to find some papers, looking for your ticket etc. this action may take some time. During this interval your sharp beamforming will point downwards to the floor and the audible contact may be lost.

Therefore, a microphone beam forming may depend on movements of a head wearing an eyeglass frame system according to the present invention. An embedded gyroscopic sensor may be used to detect such movements and the system can be adapted to modify a microphone beam forming lobe to cover both the person sitting in front and down to the floor if such a movement is detected. When the head is detected to move upwards, the original beamforming lobe may be activated again. A narrow microphone beam lobe is efficient when talking to one person but requires some stability of the head of the person being dependent on the microphone beamforming lobe. Gesture input from the person loosing audible contact with a person due to head movements can create a microphone beam forming lobe that takes into account readings from a gyroscopic sensor detecting the degree of movement away from the initial calculated microphone beam forming lobe. When the person moves his head back to the original position gesture input may restore the microphone beam forming lobe to its initially calculated form.

FIG. 1 illustrates a typical configuration of a hearing aid system comprising an eyeglass frame 10. The eyeglass frame 10 is illustrated with the outer cover of the eyeglass arm removed. Internal to the eyeglass arm there is located programmable electronics like a DSP circuit, Bluetooth communication interface, a controller like a SOC chip (System On a Chip) etc. Batteries and other necessary logic/electronics is also embedded in the eyeglass arm and also possibly inside the front part of the eyeglass frame holding the eyeglasses. The DSP circuit embedded inside the eyeglass frame may be embedded inside both eyeglass arms, i.e., a left and a right-hand eyeglass frame thereby two DSP circuits can be used. In such circumstances one of the two DSP circuits is normally configured as a master device while the other DSP circuit is configured as slave device, i.e., being controlled by the master device. The master DSP device is communicating wirelessly with earbuds 46 (or in-ear-headphones) that can be inserted into ear channels of a human. Gesture control inputs may alter the operations of the respective DSP circuits, or example.

For example, a gesture detection system may be embedded in each of the two eyeglass arms of the eyeglass frame.

A mobile phone 47 may also be part of a hearing aid system according to the present invention. In FIG. 1 it is illustrated an application program in the mobile phone that acts as an equalizer, which communicates user specified equalizer settings to the system inside the eyeglass frame 10, wherein for example a SOC circuit instructs or reprogram a DSP circuit to employ the requested frequency changes to the audio signals submitted wirelessly to earbuds 46. However, use of a mobile phone requires that the user has no severe eyesight problems. A further problem would exist if the user forgets or lose his mobile phone.

A gesture control system according to the present invention may solve such problems.

With reference to FIG. 2, a front face 12 of an eyeglass frame 10 is illustrated. On the upper part of the eyeglass front 12 there is configured four digital omnidirectional microphones 13a, 13b, 13c, 13d facing forward relative to the front of the eyeglass frame. The microphones may be arranged as a broadside microphone array. In addition, there is a video camera 15 embedded in the front of the eyeglass frame located just above a nose ridge. In each corner of the front of the eyeglass frame, adjacent to the location on the eyeglass front 12 where eyeglass arms 19, 19a are connected to the front 12 of the eyeglass frames 10, there is a microwave transducer 11 in one corner and a microwave microphone 14 in the opposite location. Microwaves emitted by the microwave transducer 11 may be reflected by for example a human face and received by the microwave microphone 14. By measuring the lapsed timespan of the emission to detection of the microwaves the distance to for example a human face the wearer of the eyeglasses is looking at can be calculated, and can be used in beamforming algorithms, for example. Such distance measurements may be initiated by a detected gesture.

FIG. 3 illustrates an example of configuration of an arm 19 of an eyeglass frame 10. In the example of FIG. 3 there are arranged six omnidirectional microphones 13*e*, 13*f*, 13*g*, 13*h*, 13*i*, 13*j* that may be arranged as a microphone broad side array. In addition, there is a microwave transducer 11*a* and a microwave microphone 14*a* that may be used to measure distances to objects or persons approaching, or which is in a close vicinity of a wearer of the eyeglass frame. Besides being part of a microphone beamforming of the six microphones 13*e*, 13*f*, 13*g*, 13*h*, 13*i*, 13*j*, the distance measure may also be part of a social distance buzzer application embedded inside the eyeglass frame.

FIG. 3 illustrates also an area 18 of the eyeglass arm surface that comprises a gesture detection sensor surface 18 enabling a wearer of the eyeglass frame according to the present invention to interact with the configured system of the eyeglass frame just by touching and moving a finger across the sensor surface 18. An aspect of the present invention is to allow gesture detection without any necessity to change an eyesight direction of a wearer of an eyeglass frame comprising a gesture detection system according to the present invention.

The gesture detection sensor surface 18 is configured to sense that a finger is touching the surface, or is close to the surface, and to detect a direction of movement of the finger across the sensor surface. With reference to FIG. 7*b*, if a finger moves from a position adjacent to a first edge 18*a* of the sensor surface 18 to a location adjacent to a second edge 18*b* of the sensor surface 18, this can be defined to be for example a forward movement across the sensor surface 18 while a movement from the second edge 18*b* to the first edge 18*a* can be defined as a backward movement of a finger across the sensor surface 18.

A movement forward of a finger, for example movement of the tip of the finger, from the first edge 18*a* may end when the finger is lifted and when the finger is located adjacent to the second edge 18*b*. This movement is detectable as a specific detectable gesture. If a backward movement ends with a finger being lifted when located adjacent to the first edge 18*b* this is a second specific detectable gesture. If a movement forward ending at the second edge 18*b* continues with a backward movement without the finger being lifted when the movement of the finger changes direction is a third specific detectable gesture. If a backward movement ends with a forward movement without the finger being lifted when the direction of the movement of the finger changes is a fourth specific detectable gesture etc.

In an example of embodiment of the present invention a sensing sensor 18 is a capacitive type sensor of a slider type. Then it is not necessary that a finger for example is physically touching the sensor surface. Changes in the capacitance is the basis for such sensors, which internally can be qualified with comparison of a sensor signal level with a defined threshold level. This enables the sensor surface to be behind an outer surface of the eyeglass arm 19, 19*a* for example, and still detect the presence of a finger. The slider architecture of the linear capacitive slider sensor enables detection of movement across the sensor surface, either by touching, moving a finger just above the sensor surface, or behind an outer wall of a computer-controlled device.

The width of the sensor surface 18 can be adapted to the width of a fingertip.

The general concept of gesture detection of the present invention is therefore to provide detection of movement directions of a finger across at least one sensor surface, and at the same time be able to detect if a finger is lifted or not when moved.

In the example of an eyeglass frame as discussed above there might be two sensor surfaces 18, one in the eyeglass arm 19 and one in the other eyeglass arm 19*a* of the eyeglass frame 10.

The first sensor surface of the first eyeglass arm 19 and the second sensor surface of the second eyeglass arm 19*a*, can be configured to either operate independently or be interpreted dependent on each other.

A forward direction of movement of a finger can be defined as detailed above, i.e. a forward movement and a backward movement. The specific mentioning of a first edge 18*a* and a second edge 18*b* of the sensor surface 18 does not rule out the possibility that a forward movement is from the second edge 18*b* towards the first edge 18*a*, and the backward movement is from the first edge 18*a* towards the second edge 18*b*.

If the two sensor surfaces are configured to operate independently each sensor surface on each eyeglass arm can be configured to interpret just forward movement, forward AND backward movement, or just backward, or backward AND forward movements. The capital "AND" signifies the logical operation AND, i.e. respective movements are made without lifting the finger in between the respective change of direction of movements. Therefore, the differentiation between just forward and forward AND backward is if the finger is detected to be lifted or not when the direction of movement of the finger changes. This simple scheme differentiates between four different gestures. Each respective sensor surface 18 can be arranged on a first eyeglass arm 19, and the other sensor surface 18 can be arranged on second eyeglass arm 19*a* of the eyeglass frame 10. If the other sensor surface on the other arm is configured to operate independent from the other sensor surface the gesture detection system can differentiate between eight different gestures qualified by which off the two sensor surfaces that detects the finger movements.

How the respective sensor surfaces are operating, either independently or in a combination, can be selected by a menu selection accessible from one of the sensor surfaces interpreting a specific gesture instructing the gesture system to interpret combinations of gestures detected on both sensor surfaces. Default casn be individual interpretations.

If the two sensor surfaces are configured to interpret the respective gestures detected on each respective sensor surface as a combined gesture, then the following combinations are possible:

| Sensor 1: | Sensor 2: |
|---|---|
| Forward | No movement |
| Backward | No movement |
| Forward AND Backword | No movement |
| Backward AND Forward | No movement |
| No movement | Forward |
| No movement | Backward |
| No movement | Forward AND Backword |
| No movement | Backward AND Forward |
| Forward | Forward |
| Forward | Backward |
| Backward | Backward |
| Backward | Forward |

This scheme provides up to 12 different detectable gestures.

It is also possible to add a movement pattern that requires a movement consisting of forward AND backward AND forward finger movements, or backward AND forward AND backward finger movements.

This may add an additional 8 detectable movement patterns consisting of:

| Sensor 1: | Sensor 2: |
| --- | --- |
| Forward AND Backwards And Forward | No movement |
| Backwards And Forward AND Backward | No movement |
| No movement | Forward AND Backwards And Forward |
| No movement | Backwards And Forward AND Backward |
| Forward AND Backward AND | Forward |
| Forward AND Backward AND | Backward |
| Backwards AND Forward AND | Forward |
| Backwards AND Forward AND | Backward |

According to a further aspect of the present invention an accelerometer may be part of a gesture detection system according to the present invention. An accelerometer can be configured to detect tapping of a finger on an arm of the eyeglass frame 10. Therefore, each of the possible gestures defined above can be qualified with two taps or three taps, for example. This will double the number of different detectable gestures from twenty to forty different gestures. A gesture detection will then start with two or three taps on an eyeglass arm before the gesture itself is applied onto the sensor surface 18.

It is within the scope of the present invention to configure different voice messages, for example in the example of an eyeglass frame discussed above. The SOC computer system can be configured to transmit wireless voice messages to a user of the eyeglass frame via the insertable earbuds. In this manner the gesture detection system of the present invention provides a bidirectional communication system wherein a specific gesture can result in a voice message being sent to the user initiating the gesture.

This option can be utilized in different manners. For example, as illustrated in FIG. 7*a*, a menu system for a complex system can be implemented as a list of main menus, Root menu A, Root menu B, Root menu C, (root menus in a tree structure of menus), wherein the list and activations of respective commands or actions, Sub Menu 1*a* for example, is under control of a configured computer system. For example, when a system like the eyeglass frame system discussed above starts, a voice message from the configured SOC system can tell the user to move a finger Forward on a sensor surface on a left eyeglass arm, for example. Then the menu system starts to operate, and a user can move between root menus by repeated Forward movements as indicated with arrows downwards in FIG. 7*a*, or or example, from Root menu A to Root menu C as illustrated in FIG. 7*a* with horizontal arrows. The names of each root menu may be conveyed to the user via a respective voice message. When a user selects one of the root menus, for example Root menu B, after being told that the user is at the Root menu B by the system, the user can use a Forward AND Backward gesture, for example, to signal to the system that the Root menu B is selected. Then sub menus are available, and the user can perform further Forward movements to move among the sub menus, for example from Sub Menu 1B to Sub menu iB. If the user moves too far downwards in a menu tree the user can for example use a Backward movement to move upwards in the menu tree. This applies also to movements among respective root menus.

Different sub menus may require more complex gestures like the ones exemplified above to start a specific command or action. Anyhow, voice messages from the system may inform the user which gestures are necessary to use. The use of the accelerometer and tapping patterns may for example reset a selected command etc. Tapping can also be used to add a parameter value for a parameter used in a beam forming lobe, for example. Such operations can also be conveyed to a user via voice messages.

Therefore, when pre-recorded voice messages are part of a man-machine interaction system comprising a gesture detection system according to the present invention, the number of detectable different gestures may be a limited number of different gestures. In the example illustrated in FIG. 7*a*, a forward defined movement and lifting the finger, and a backward movement and lifting the finger, and a forward movement AND a backward movement (without lifting the finger in between the respective forward and backward movements) are the only necessary gestures in this example.

Below follow some examples of gesture detections that may be utilized in an eyeglass frame being part of a hearing aid system.

A video camera 15 may be embedded on a front side 12 of an eyeglass frame 10 according to the present invention. FIG. 4 illustrates a side view of a microphone array 20 comprising a video camera 15 in the middle section (not illustrated). The camera sees for example an object being a sound source having a side surface 24 faced towards the camera 15 in a distance 23 from the microphone array 20. The distance is illustrated being to a plane passing the front of the object 24. A measurement of the distance 23 can be done with for example a microwave transducer 14 and a microwave receiving microphone 11. The time laps between the issue of the microwave until a microwave is received by the microphone can be used to calculate the distance.

The height of the object 24 defines the slope of the side lines 22 and 25 that together with the plane representing the height of the object 24 constitutes a triangle in the plane, but which is a cone in three dimensions, i.e. the cone represents a desired beamforming lobe when listening to sound from the object 24. As illustrated in FIG. 4 a beamforming lobe 26 is arranged inside the triangle as discussed above. It is also illustrated some side lobes, which can be eliminated or reduces by proper selection of parameters for a beam forming algorithm. If the distance to the sound source changes, for example if the wearer of the eyeglass frame system is mowing towards the sound source, the beamforming lobe should be wider to account for the perspective increase of the height of the sound source, for example. This can be under control of a specific gesture.

FIG. 5 illustrates a scenario typical for a conference where participants sits around a table. Person B is wearing an eyeglass frame 10 according to the present invention. The video camera 15 and the video image processing can detect that persons C, D, E and F is within the field of view of the camera. Person A is also participating in the meeting but is outside the field of view of the video camera 15. On the right-hand eyeglass arm 19 of the eyeglass frame 10 supported by person B, there is a microphone array as discussed above. There is also a possibility to perform distance measurement with the respective microwave devices 11*a* and 14*a* arranged on an arm of the eyeglass frame 10. Thereby a beam forming based on the microphone array located on the eyeglass arm 19 facing the person A is possible. This can be done on both sides of the eyeglass frame. Thereby the eyeglass frame can be configured with three different beamforming lobes pointing in different directions. The selection of the number of respective lobes and other parameter settings of the lobes can be done via gesture control.

In an example of embodiment of the present invention, a gyroscopic device may be part of an eyeglass frame system according to the present invention. When a gyroscope detects a change of direction of the head as discussed above it is possible to change the width of the lobe thereby increasing the lobe including all persons B, C, D, E, F and G.

In all these situations a wearer of the eyeglass frame may need to input different gestures representing different alterations of for example a beamforming, direction of a beamforming lobe etc.

FIG. 6 illustrates an example of two microphone beam forming lobes 27 and 30 that is pointing in a respective direction 28 and 31. The lobe 28 is directed in a direction having an angle cc relative to the eyesight direction 29. As discussed above, a "zero" angle in a gyroscopic sensor can be initialized via a specific gesture. The other lobe direction 31 has an angle β relative to the eyesight direction 29. These settings can be made via specific gesture inputs.

According to an aspect of the present invention, a gesture detection system comprises at least a first sensing surface arranged on an outside surface of at least one of the two eyeglass arms. In combination with an embedded accelerometer in the at least one of the two eyeglass arms, a plurality of different simple gestures can be differentiated and detected by the configured system of the eyeglass frame, and thereby be associated with different actions or deactivations of sensors, devices and configured functionality as well as modifications of actions or deactivations of sensors and configured functionality of the system embedded in the eyeglass frame. In combination with pre-recorded voice messages the number of different detectable gestures may be limited.

FIG. 8 illustrates an example of embodiment of an eyeglass frame system comprising functional digital circuits and functional blocks embedded inside an eyeglass frame as illustrated in FIG. 1.

For example, digital microphones 13 may be of the type TDK ICS-41351 which can be connected to an audio signal processor 54 for example of the type Analog Devices ADAU1787 that can receive audio input from 8 digital microphones. As discussed above there may be two DSP devices in an eyeglass frame, one in each eyeglass frame, and in an example of embodiment will six microphones embedded in one eyeglass arm be connected to the DSP 54 embedded in the same arm. In addition, two of the four microphones embedded in the front of the eyeglass frame will be controlled by the same DSP 54. Another eyeglass arm will control six microphones in the other eyeglass frame plus two remaining microphones of the four microphones in front of the eyeglass frame. Information about the TDK ICS-41351microphone can be found on https://www.invensense.com/products/digital/ics-41351/.

The ADAU1787 has beamforming capabilities which is disclosed in the link https://www.analog.com/en/products/adau1787.html#product-overview Analog devices supplies also a user application program facilitating beamforming via a graphical user interface. Such a graphical user interface is also available as an application program that may be installed in the mobile phone 47.

In addition, the ADAU1787 is a fully programmable DSP device, which enables support of different user selectable options defined in a user profile and/or different hearing aid modes as discussed above.

The controller 32 controlling respective digital functional system-blocks can be a circuit of the type denoted a SOC, (System On a Chip,) which is an integrated circuit comprising all functional components of a computer. The use of a SOC 32 makes it much simpler to develop software configuring the operational aspects of an eyeglass frame system being in communication with a gesture detection system according to the present invention.

FIG. 8 illustrates further that the system may comprise an accelerometer 41. A functional aspect of the accelerometer 41 is for example to detect touching of a finger on the eyeglass frame. It is known that such touching will generate noise picked up by the microphones and the system will generate sharp noise in the system. According to an example of embodiment of the present invention, accelerometer detections can result in a short muting of the microphones or any other suitable electronic part of the system. In some examples of embodiments, the eyeglass frame may be configured with some push buttons 41. Activations of such buttons 41 will result in a short muting stopping noise from the button action to reach ear buds 46.

The exemplary embodiment illustrated in FIG. 8 comprises at least one gesture detection sensor 18 that can be of a capacitive sensor type. A sensor often denoted a linear slider detector can be used. Refer the following link https://www.fujitsu.com/downloads/MICRO/fme/articles/fujitsu-whitepaper-capacitive-touch-sensors.pdf with reference to FIG. 4 illustrating a capacitive touch slider implementation with interpolation.

With reference to the discussion above, the accelerometer will trigger muting of the audio stream whenever a finger is touching the eyeglass frame. When the touching is part of a menu selection gesture, the muting is over when the finger is lifted from the sensor surface.

The system illustrated in FIG. 8 may also comprise a gyroscope 40. There are several known gyroscopes that may be used in examples of embodiments of the present invention.

In an example of embodiment of the present invention, the SOC system 32 is configured to identify a compass direction of the eyesight direction given by the gyroscope 40. The SOC system 32 is then configured to instruct the audio DSP 45 to perform beamforming in the compass direction ahead of the eyeglass frame 10.

In this manner the beamforming is directed to the direction the wearer of the eyeglass frame 10 is looking.

The wireless communication system of an eyeglass frame 10 can follow for example a Blue tooth standard. With reference to FIG. 8, a Bluetooth antenna 33 is in communication with the SOC 32 via a RF filter section 34.

It is within the scope of the present invention that other communication standards may be used.

It is also within the scope of the present invention to use a communication standard comprising device addresses, i.e., a wireless signal from the eyeglass frame 10 may comprise a specific first address for an ear bud 55 inside the right-hand ear and a second specific address for an earbud 55 in the left-hand ear. Then different information can be sent to respective different ears. For example, if the microwave devices 14a, 11a on one of the eyeglass frames detects an approaching object on the right-hand side, the SOC 44 may be configures to send a warning to the earbud 55 located inside the right-hand ear of the wearer of the eyeglass frame.

The possible address mechanism may also stop wireless intercommunication between two eyeglass frames 10 that is used by two persons standing close to each other. This may stop mixing for example gesture detection and corresponding submitted voice messages.

According to an example of embodiment of the present invention, a gesture detection system may comprise at least one linear capacitive slider sensor, wherein a sensor surface of the at least one linear capacitive slider sensor is integrable on an outer surface of a computer-controlled device, wherein the capacitive slider sensor is configured to detect movements of a finger moving along a longitudinal direction on the sensor surface from one end of the sensor surface to a second end opposite the first end,
wherein the gesture detection system is configured to interpret different detected finger movement patterns across the sensor surface as different gestures,
wherein the interpretation of a respective one of respective finger movement combinations is performed when the linear capacitive slider sensor detects that a finger is lifted at the first end or the second end of the sensor surface after at least one finger movement has been detected across the sensor surface in any direction between the first edge and the second edge.

According to the example of embodiment disclosed above, the embodiment may comprise an accelerometer which may be part of the gesture detection system. A defined number of tapping registered by the accelerometer may be used to qualify a detected finger movement on the linear capacitive slider sensor surface.

According to the example of embodiment disclosed above, a defined number of tapping registered by the accelerometer may reset a command being executed in the computer system as a result of a detected gesture.

According to the example of embodiment disclosed above, a defined number of tapping registered by the accelerometer may initialize a parameter of a command being executed as a result of a detected gesture.

According to the example of embodiment disclosed above, the gesture detection system may comprise at least two independent linear capacitive slider sensors.

According to the example of embodiment disclosed above, the gesture detection system may be configured to interpret finger movements detected by each respective linear capacitive slider sensors independently of each other.

According to the example of embodiment disclosed above, the gesture detection system may be configured to interpret finger movements detected by each respective linear capacitive slider sensors as a combination of the respective detected finger movements.

According to the example of embodiment disclosed above, a first gesture may be defined by a finger moving from the first edge of the sensor surface towards the second edge, wherein the finger is detected to be lifted when located adjacent to the second edge.

According to the example of embodiment disclosed above, a second gesture may be defined by a finger moving from the second edge of the sensor surface towards the first edge, wherein the finger is detected to be lifted when located adjacent to the first edge.

According to the example of embodiment disclosed above, a third gesture may be defined by a finger moving from the first edge of the sensor surface towards the second edge, and the finger moves back from the second edge towards the first edge, and the finger is detected to be lifted when the finger is detected to be back at a location on the sensor surface adjacent to the first edge.

According to the example of embodiment disclosed above, a fourth gesture may be defined by a finger moving from the second edge of the sensor surface towards the first edge, and the finger moves back from the first edge towards the second edge, and the finger is detected to be lifted when the finger is detected to be back at a location on the sensor surface adjacent to the second edge.

According to the example of embodiment disclosed above, the gesture detection system may be configured with voice messages indicating which gesture is detected.

According to the example of embodiment disclosed above, the gesture detection system may be configured to identify gestures associated with navigation commands in a menu tree indicating actions implemented in the computer-controlled device.

According to the example of embodiment disclosed above, a first defined gesture may be for navigation upwards in the menu tree, a second defined gesture may for navigation downwards in the menu tree while a third defined gesture may be for selecting a menu member in the menu tree.

According to the example of embodiment disclosed above, a width of the sensor surface may be adapted to a size of a fingertip.

According to the example of embodiment disclosed above, the computer device may be integrated into an eyeglass frame and at least one linear capacitive slider sensor may be integrated into one of the eyeglass arms.

According to the example of embodiment disclosed above, the linear capacitive slider sensor may be embedded inside an outer surface wall of the computer-controlled device.

The invention claimed is:

1. A gesture detection system comprising: at least one linear capacitive slider detector integrable on an outer surface of a computer-controlled device, the at least one linear capacitive slider detector includes a sensor surface having at least a first edge and a second edge that is opposite the first edge, the at least one linear capacitive slider detector being configured to at least detect: a finger touching the sensor surface; and a movement of the finger along the sensor surface; and the finger lifted off the sensor surface; wherein the computer-controlled device is configured to interpret detected movement of the finger relative to the sensor surface to determine valid gesture movements; wherein valid gesture movements include: the finger touching the sensor surface at the first edge or the second edge; and movement of the finger along the sensor surface at least from the first edge of the sensor surface to the second edge of the sensor surface, or at least from the second edge of the sensor surface to the first edge of the sensor surface; and the finger lifted off the sensor surface at the first edge or the second edge; and an accelerometer, wherein a defined number of tapping registered by the accelerometer is used to qualify a detected finger movement on the sensor surface, and wherein a defined number of tapping registered by the accelerometer resets a command being executed by the computer-controlled device as a result of a detected gesture.

2. The system of claim 1, wherein the at least one linear capacitive slider detector comprises at least two independent linear capacitive slider detectors.

3. The system of claim 2, wherein the computer-controlled device is configured to interpret finger movements detected by each of the at least two linear capacitive slider detectors independently of each other.

4. The system of claim 2, wherein the computer-controlled device is configured to interpret finger movements detected by each of the at least two linear capacitive slider detectors as a combination of the detected finger movements.

5. The system of claim 1, wherein a first gesture is defined by a finger moving from the first edge of the sensor surface to the second edge and the finger is lifted off the sensor surface at the second edge.

6. The system of claim 1, wherein a second gesture is defined by a finger moving from the second edge of the sensor surface to the first edge and the finger is lifted off the sensor surface at the first edge.

7. The system of claim 1, wherein a third gesture is defined by a finger moving from the first edge of the sensor surface to the second edge and from the second edge to the first edge, and the finger is lifted off the sensor surface at the first edge.

8. The system of claim 1, wherein a fourth gesture is defined by a finger moving from the second edge of the sensor surface to the first edge and, from the first edge to the second edge, and the finger is lifted off the sensor surface at the second edge.

9. The system of claim 1, wherein the computer-controlled device is configured with voice messages indicating which gesture is detected.

10. The system of claim 1, wherein the computer-controlled device is configured to identify gestures associated with navigation commands in a menu tree indicating actions implemented in the computer-controlled device.

11. The system of claim 10, wherein a first defined gesture is for navigation upwards in the menu tree, a second defined gesture is for navigation downwards in the menu tree while a third defined gesture is for selecting a menu member in the menu tree.

12. The system of claim 1, wherein a width of the sensor surface is adapted to a size of a finger.

13. The system of claim 1, wherein the computer-controlled device is integrated into an eyeglass frame and the at least one linear capacitive slider detector is integrated into one eyeglass arm.

14. The system of claim 13, wherein the linear capacitive slider detector is embedded inside an outer wall of the computer-controlled device.

15. A gesture detection system comprising: at least one linear capacitive slider detector integrable on an outer surface of a computer-controlled device, the at least one linear capacitive slider detector includes a sensor surface having at least a first edge and a second edge that is opposite the first edge, the at least one linear capacitive slider detector being configured to at least detect: a finger touching the sensor surface; and a movement of the finger along the sensor surface; and the finger lifted off the sensor surface; wherein the computer-controlled device is configured to interpret detected movement of the finger relative to the sensor surface to determine valid gesture movements; and wherein valid gesture movements include: the finger touching the sensor surface at the first edge or the second edge; and movement of the finger along the sensor surface at least from the first edge of the sensor surface to the second edge of the sensor surface, or at least from the second edge of the sensor surface to the first edge of the sensor surface; and the finger lifted off the sensor surface at the first edge or the second edge; and an accelerometer, wherein a defined number of tapping registered by the accelerometer is used to qualify a detected finger movement on the sensor surface, and wherein a defined number of tapping registered by the accelerometer initializes a parameter of a command being executed as a result of a detected gesture.

* * * * *